(12) United States Patent
Gkortsas et al.

(10) Patent No.: US 12,429,624 B2
(45) Date of Patent: Sep. 30, 2025

(54) AUTOMATED FACIES CLASSIFICATION FROM WELL LOGS

(71) Applicant: Schlumberger Technology Corporation, Sugar Land, TX (US)

(72) Inventors: Vasileios-Marios Gkortsas, Boston, MA (US); Lin Liang, Belmont, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 34 days.

(21) Appl. No.: 17/593,092

(22) PCT Filed: Mar. 11, 2020

(86) PCT No.: PCT/US2020/021949
§ 371 (c)(1),
(2) Date: Sep. 9, 2021

(87) PCT Pub. No.: WO2020/185808
PCT Pub. Date: Sep. 17, 2020

(65) Prior Publication Data
US 2022/0146705 A1    May 12, 2022

Related U.S. Application Data

(60) Provisional application No. 62/816,606, filed on Mar. 11, 2019.

(51) Int. Cl.
*G01V 11/00*     (2006.01)
*E21B 49/00*     (2006.01)

(52) U.S. Cl.
CPC ............. *G01V 11/00* (2013.01); *E21B 49/00* (2013.01)

(58) Field of Classification Search
CPC . G01V 11/00; G01V 3/18; G01V 3/38; G01V 99/005; E21B 49/00
See application file for complete search history.

(56) References Cited

U.S. PATENT DOCUMENTS 6,295,504 B1 * 9/2001 Ye .............................. G01V 3/38
702/7
2010/0040281 A1 * 2/2010 Chen ......................... G06N 3/08
340/853.2

(Continued)

FOREIGN PATENT DOCUMENTS

FR       2947642 A1 *  1/2011  ............. G01V 99/00
WO       0131366 A1   5/2001
WO    2015130313 A1   9/2015

OTHER PUBLICATIONS

Tobias Giesgen, "Coupling unsupervised segmentation in wells with automatic implicit modeling in a Bayesian framework", Aug. 9, 2018, Delft University of Technology (Year: 2018).*
Bishop, C. "Pattern Recognition and Machine Learning", Springer, 2006, pp. 430-444.
Dubois, M. K. et al., "Comparison of four approaches to a rock facies classification problem", Computers Geosciences, 2007, 33(5), pp. 599-617.

(Continued)

*Primary Examiner* — Catherine T. Rastovski
*Assistant Examiner* — Yossef Korang-Beheshti
(74) *Attorney, Agent, or Firm* — Jeffrey D. Frantz (57) ABSTRACT

Facies of a formation are classified from data charactering properties of a portion of the formation as a function of depth, wherein the number of facies is determined automatically in an unsupervised manner without human input. In one embodiment, a layer-based methodology is provided that performs facies classification based on layer-based properties which are determined from well log data obtained from a plurality of different well logging tools. In another embodiment, a depth-based methodology is provided that performs facies classification based on well log data obtained depth-by-depth from a plurality of different well logging tools. The number of facies can be determined (Continued)

automatically without human input, for example using the Bayesian Information Criterion or a method which determines the optimal number of clusters based on the repeatability of the clustering results. In embodiments, the facies classification can be performed using the Gaussian mixture model (GMM) method.

16 Claims, 10 Drawing Sheets

(56) References Cited

U.S. PATENT DOCUMENTS

| | | | | |
|---|---|---|---|---|
| 2013/0103319 | A1* | 4/2013 | Buiting | G01V 11/00 |
| | | | | 702/86 |
| 2015/0134255 | A1* | 5/2015 | Zhang | G01V 5/04 |
| | | | | 702/14 |
| 2016/0130916 | A1* | 5/2016 | Abadie | G01V 3/38 |
| | | | | 703/10 |
| 2016/0364654 | A1* | 12/2016 | Gevirtz | G06N 20/00 |
| 2018/0003839 | A1* | 1/2018 | Lowell | G01V 1/302 |
| 2018/0267204 | A1* | 9/2018 | Eyvazzadeh | E21B 47/107 |

OTHER PUBLICATIONS

Giesgen, T., "Coupling unsupervised segmentation in wells with automatic implicit modeling in a Bayesian framework", Master of Science in Applied Geophysics Research Thesis, 2018, 86 pages.
Hall, B., "Facies classification using machine learning", The Leading Edge, 2016, 35(10), pp. 906-910.
"HRA: Heterogeneous Rock Analysis—Users Gide", Petrel Plug-In Modules for Cluster Analysis and Cluster Tagging, Version 2.0, May 31, 2011, 46 pages.
Schwartz, G., "Estimating the Dimension of a Model", The Annals of Statistics, 1978, 6(2), pp. 461-464.
Skalinski, M. et al., "Defining and Predicting Rock Types in Carbonates Preliminary Results from an Integrated Approach using Core and Log Data from the Tengiz Field", Petrophysics, 2006, 47(1), pp. 37-52.
Search Report and Written Opinion of related International Patent Application No. PCT/US2020/021949 dated Jun. 12, 2020, 9 pages.
International Preliminary Report on Patentability of related International Patent Application No. PCT/US2020/021949 Sep. 23, 2021, 11 pages.
Communication pursuant to Article 94(3) issued in European Patent Application No. 20715254.7 dated Mar. 13, 2023, 7 pages.

* cited by examiner

AUTOMATED FACIES CLASSIFICATION FROM WELL LOGS

FIELD

The subject disclosure relates to the evaluation of geological formations. More particularly, the subject disclosure relates to methods of classifying facies of a geological formation which is particularly useful in petrophysical formation evaluation and reservoir characterization, although the disclosure is not limited thereto.

BACKGROUND

In the context of geological formations, a facies is a body or unit of rock that is characterized by a particular combination of petrophysical properties (such as lithology, physical, electrical and chemical properties) that bestow an aspect to the rock that is different from adjacent bodies or units or rock, which can be above, below or laterally adjacent to the rock. The classification of facies is critical in formation evaluation and reservoir characterization and can significantly improve the chances of success of a well. The classes that are associated with different facies can represent geological facies or essential petrophysical properties ranges.

Considerable progress has been made in developing various methods of classifying facies for the oil industry, and several applications are now available in the commercial software, such as Indexation Probability and Self Organized Map (IPSOM) (See, e.g., Skalinski, M. et al., "Defining and Predicting Rock Types in Carbonates Preliminary Results from an Integrated Approach using Core and Log Data from the Tengiz Field", Petrophysics, vol. 47, no. 1, pp. 37-52 (2006); and Kohonen, T., "Self-Organizing Maps", Springer Series in Information Sciences, extended $3^{rd}$ edition (2001)) and Heterogeneous Rock Analysis (HRA) in Techlog. Both workflows take well logs as inputs and partition them into clusters to represent facies of distinctive rock types.

IPSOM uses single or multi-variable data as input to identify patterns/groups in data using the principle of "self-organizing map" (SOM). A SOM is an artifical neural network which is trained and represented in a two-dimensional view. This architecture of neural network was originally devised by T. Kohonen and is also referred to as the Kohonen map. The learning algorithm of IPSOM is competitive learning, a form of unsupervised learning in which nodes compete for the right to respond to a subset of the input data. Once the learning is complete, indexation takes place which involves a classification to each node of the Kohonen map. See, Kohonen, T., "Self-Organizing Maps", Springer Series in Information Sciences, extended 3rd edition (2001). The indexation technique used is hierarchical clustering.

In a similar manner, HRA is an unsupervised classification workflow, using k-means clustering. It includes two components: an electro-facies clustering component (cluster analysis) that partitions logs into uniquely recognizable patterns in a master data set; and a discriminate analysis component (cluster tagging) that finds the same pattern in a different data set.

Both workflows require that the user provide the number of classes (facies) over which the input log data are classified as an input parameter. As a result, the user must try different classifications with varying number of classes (facies) and must decide which number of facies gives the most appropriate classification based on qualitative criteria such as Silhouette plots. In addition, the classification is performed on well logs depth-by-depth. This has the disadvantage that the classification boundaries and the layer boundaries are not usually the same.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, methods and systems are provided that classify facies of a portion of a formation based on data charactering properties of the portion of the formation as a function of depth, wherein the number of facies is determined automatically in an unsupervised manner (without human input). In one embodiment, a layer-based methodology is provided that performs facies classification based on layer-based properties which are determined from well log data obtained from a plurality of different well logging tools. In another embodiment, a depth-based methodology is provided that performs facies classification based on well log data obtained depth-by-depth from a plurality of different well logging tools. The number of facies can be determined automatically without human input, for example using Bayesian Information Criterion or by a method where the optimal number of facies is determined based on the repeatability of the clusteting results. In embodiments, the facies classification can be performed using the Gaussian mixture model (GMM) method.

In embodiments, accurate detection of layer boundaries can be used to create a layer model that can aid in petrophysical evaluation of the formation, especially for thin beds. Accurate detection of the layer boundaries also permit a reconstruction of logs by running the tool response simulator or convolving the layer model with corresponding kernels for each tool.

In one embodiment, unsupervised facies classification is conducted utilizing a layer-based method that performs facies classification based on layer-based properties which are determined from well log data after processing, e.g., upscaling or deconvolution. Thus, instead of performing classification using the log values at each depth as done in the prior art IPSOM and HRA methods, layer-based classification is conducted. Parts of the well log data can be obtained from a high-resolution well logging tool, such as the Oil-Based Microimager (OBMI) tool of Schlumberger, and then processed to determine the layer boundaries by performing a log squaring or other changing point detection algorithms. The well log data from the multiple tools can then be upscaled into a layer model that includes layer-based property vectors that are processed for facies classification. In addition, the number of facies is not given by the user but is determined automatically. For example, the number of facies can be determined by processing the layer-based property vectors of the layer model using the Bayesian Information Criterion (BIC) with/without combining it with the entropy method or by using a method based on the repeatability of the clustering results.

In another embodiment, unsupervised facies classification is conducted using a depth-based method that performs facies classification based on properties which are determined from well log data obtained on a depth-by-depth basis. In addition, the number of facies is not given by the user but is determined automatically. For example, the number of facies can be determined by processing the well log data on a depth-by-depth basis using the Bayesian Information Criterion (BIC) with/without combining it with the entropy method or by using a method based on the repeatability of the clustering results.

Additional aspects, embodiments, and advantages of the disclosure may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
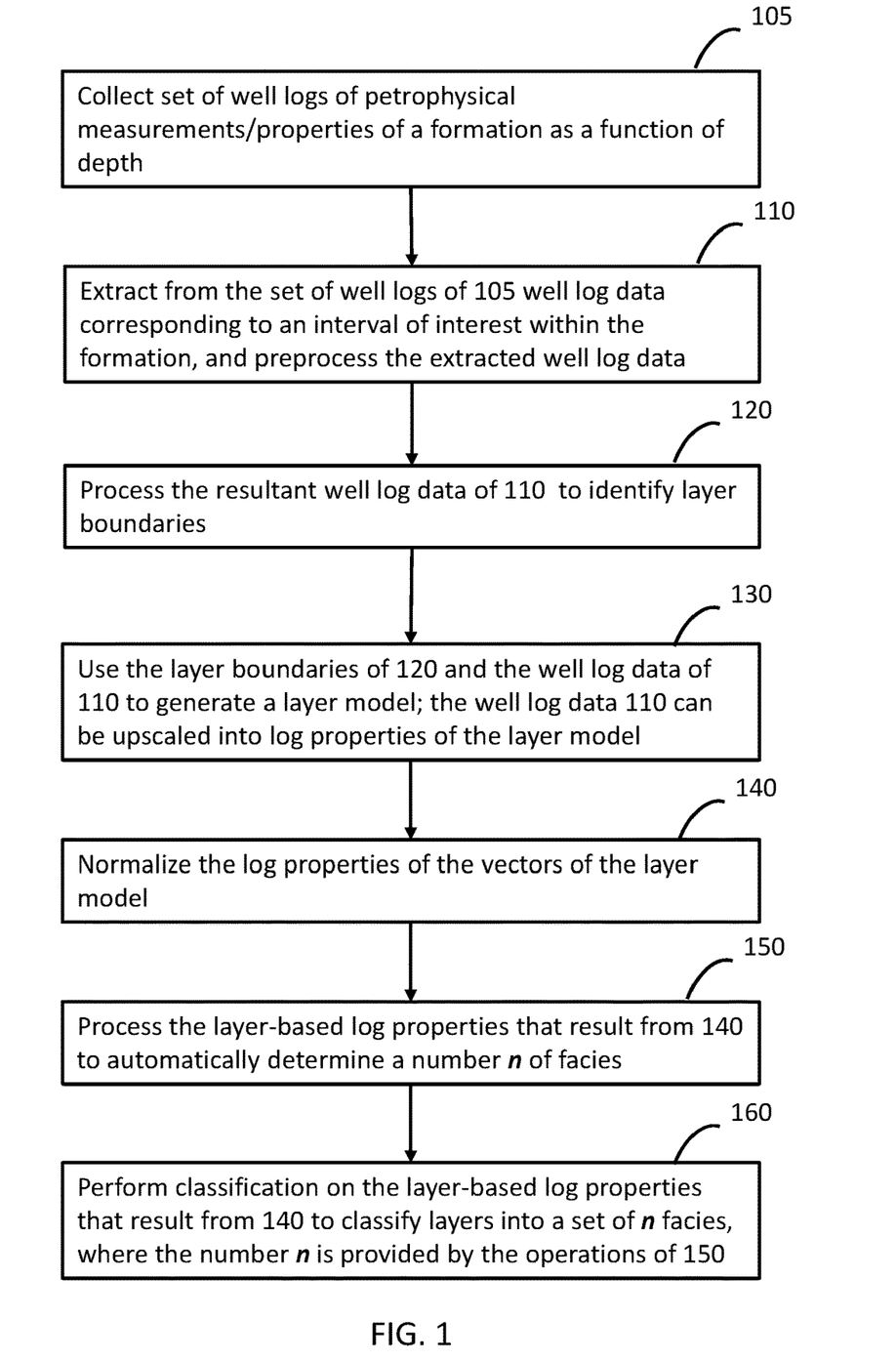
FIG. 1 is a flow chart of a layer-based unsupervised facies classification method according to the present disclosure.

FIG. 1 is a flow chart of a layer-based facies classification method according to the present disclosure. At 105, a set of well logs pertaining to a formation is collected. The set of well logs include petrophysical measurements or properties of the formation as a function of depth within a borehole that traverses the formation. In embodiments, one or more of the well logs of the set can provide a relatively high degree of spatial resolution to provide relatively high resolution measurements or image(s) of the relevant petrophysical properties as a function of depth.

At 110, well log data corresponding to an interval of interest (or portion) within the formation is extracted from the set of well logs of 105, and the extracted well log data is preprocessed. For example, the preprocessing can involve checking and validating the extracted well log data to ensure that the well log data is in proper ranges without missing values. In another example, the preprocessing can involve performing Principal Component Analysis (PCA) or auto-encoding on the extracted well log data for dimension reduction.

At 120, the resultant well log data of 110 is processed to identify layer boundaries. In embodiments, such processing can employ log squaring or other changing point detection algorithms.

At 130, the layer boundaries of 120 and the well log data of 110 are used to generate a layer model that includes a number of layers each having an associated vector of log properties and data representing the layer boundaries (e.g., layer boundary depth values) for the respective layers. Different approaches such as log squaring, averaging, deconvolution, etc., may be used to upscale the log properties represented by the well log data of 110 into the layer model.

At 140, the log properties of the vectors of the layer model can be normalized. In addition, the log properties of the vectors of the layer model can possibly be assigned weights based on the quality of facies discrimination provided by the logging tool that measured the underlying well log data. Such weights can be configured to appropriately scale the log properties of the layer model that are derived from different logging tools with varying resolution. In embodiments, a minimum threshold layer thickness may be defined, so that only layers of the layer model that have a thickness greater than or equal to this minimum threshold layer thickness are used for operations of blocks 150 and 160.

At 150, the resultant layer-based log properties of 140 are processed to automatically determine a quantity or number n of facies. In embodiments, the processing can employ a method where the number n of facies is determined based on the repeatability of the clustering results. Alternatively it can employ the Bayesian Information Criterion (BIC) to determine the quantity or number n of facies. Details of Bayesian Information Criterion (BIC) are set forth in Schwarz, G., "Estimating the dimension of a model", Annals of Statistics, vol. 6 no. 2, pp. 461-464 (1978)). The processing of 150 can optionally combine Bayesian Information Criterion (BIC) with an entropy method to determine the quantity or number n of facies.

Figure 3A:
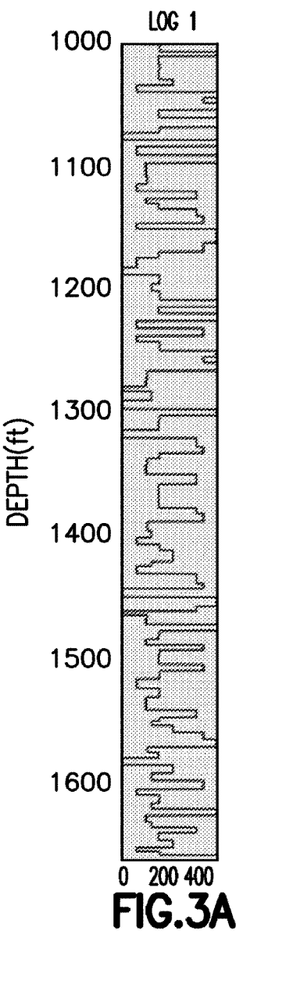
FIGS. 3A, 3B and 3C depict three well logs of a formation for input to the facies classification method of FIG. 1.
Figure 3B:
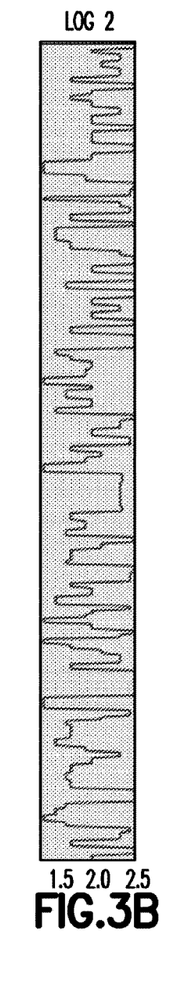
Figure 3C:
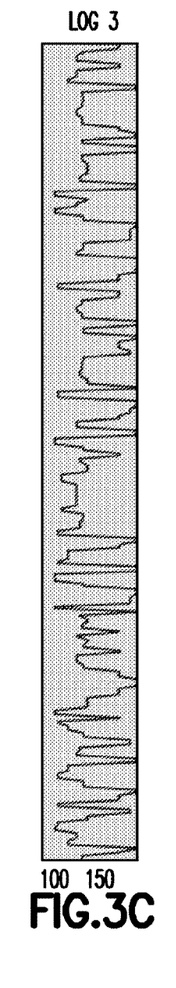
Figure 3D:
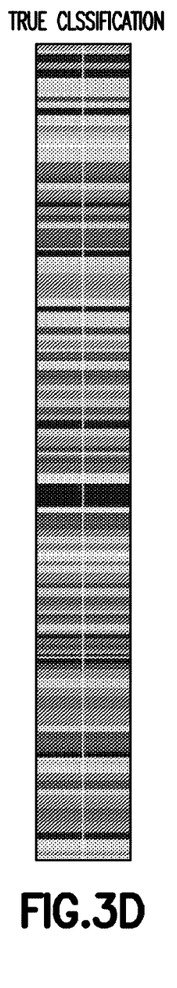
FIG. 3D depict a true facies classification for the formation characterized by the well logs of FIGS. 3A, 3B and 3C.
Figure 3E:
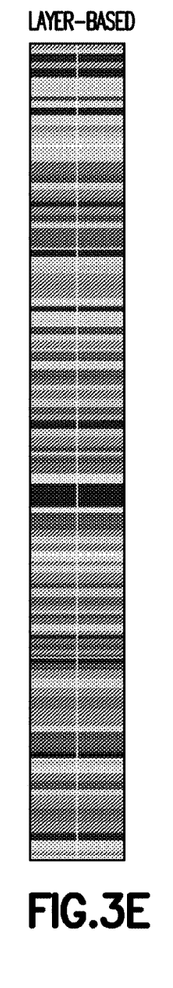
FIG. 3E depicts a predicted facies classification that results from the facies classification method of FIG. 1 based on input from the three well logs of FIGS. 3A, 3B and 3C.
Figure 3F:
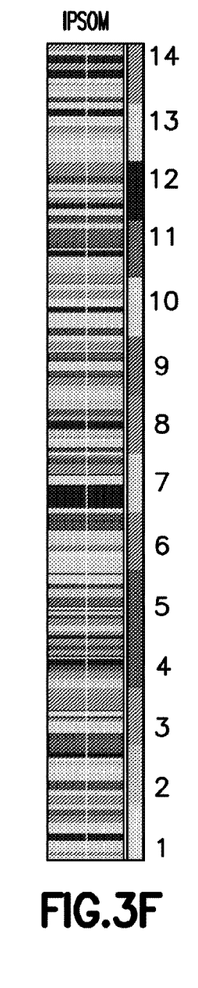
FIG. 3F depicts a facies classification that results from the prior art IPSOM method based on input from the three well logs of FIGS. 3A, 3B and 3C.

At 160, classification is performed on the layer-based log properties that result from 140 to classify or identify a set of n facies, where the number n is provided by the operations of 150. Different classification algorithms may be utilized. By way of example, and as discussed hereinafter, the Gaussian mixture models (GMM) method may be utilized (see, e.g., Bishop, C., "Pattern Recognition and Machine Learning", Springer (2006)). In the classification, a thin layer with thickness less than a threshold thickness can be assigned to the same class with a layer of thickness higher than threshold whose value is the closest to the value of that thin layer. Data representing the set of n facies can be stored electronically for subsequent analysis and/or used to output and display a visual representation of the set of n facies, such as a plot of the set of n facies as a function of depth in the formation (FIG. 3E).

In the layer-based facies classification method, the boundaries between different classes or facies can be forced to be the same as corresponding layer boundaries determined at 120. Since accurate layer boundaries are important for the classification accuracy and the creation of the layer model, in one embodiment, the layer boundaries of 120 can be determined through log squaring or other changing point detection algorithms as applied to log properties obtained from a relatively high-resolution well logging tool, such as the Oil-Based Microimager (OBMI) tool of Schlumberger.

Moreover, in embodiments, the facies classes can be identified simultaneously from well log data of varying resolution. In this case, the operations of 140 can first normalize the well log properties of the layer model (for example, using a min-max normalization) and then assign weights to the normalized well log properties based on the quality or resolution of facies classification provided by the logging tool that measured the underlying well log data. Such weights can be configured to appropriately scale the log properties of the layer model that are derived from different logging tools with varying resolution. While this is one way to normalize and weigh the input data, other methods for the data normalization and weighting may be utilized.

When classifying synthetic data, any unsupervised learning algorithm, such as k-means or hierarchical clustering, can be used to perform the classification. However, when the classification is performed on field data, which is the case for the facies classification operations of 160, the facies classification needs to account for a covariance structure for each facies, and an algorithm like k-means which performs "hard" assignment to the classification has some limitations. To address this issue, according to one embodiment, the facies classification operations can employ the Guassian mixture model (GMM) method. A GMM is a probabilistic model that assumes all the data points are generated from a mixture of a finite number of Gaussian distributions with unknown parameters. One can think of mixture models as generalizing k-means clustering to incorporate information about the covariance structure of the data. By adopting such an approach, a "soft" assignment of data points to clusters is obtained in a way that reflects the level of uncertainty over the most appropriate assignment.

Another advantage of the layer-based facies classification method of FIG. 1 is that the number or quantity n of facies used in the classification is determined automatically and the user does not have to give it as an input. In embodiments, the number or quantity n of facies can be determined either using a method where the number of facies is automatically determined based on the repeatability of the clustering results or using the BIC criterion.

The facies classification operations of 150 can be determined by a method where the optimal number of facies (clusters) is based on the repeatability or consistency of the clustering results, i.e., the aim is to find an optimal number of clusters, based on the fact that the clustering algorithm can always obtain the result with acceptable repeatability or consistency. In this approach, an arbitrary number of facies (clusters) is assumed and for each number of clusters, multiple realizations of clustering are performed to obtain an ensemble of the cluster logs, from which a repeatability score can be computed. Repeating this process by enumerating the assumed number of clusters, a curve revealing the relationship between the similarity versus the number of facies (clusters) is obtained. This curve always starts from a high score (i.e., ~1) and decreases with the growing number of facies (clusters). A threshold reflecting the desired similarity can be used to determine the number of facies (clusters) to be used for the clustering. Furthermore, a filtering technique can be employed to suppress the negative effect of thin layers in the clustering results. An example of this approach is shown at the field data example later in the disclosure.

In other embodiments, the number or quantity n of facies can be determined in 150 using the BIC criterion. The BIC is a criterion for model selection among a finite set of models, is based on the likelihood function and can be used to select the number of components in a Gaussian mixture in an efficient way. In one embodiment, each Gaussian component may be treated as a cluster. When fitting models, it is possible to increase the likelihood by adding parameters, but this may lead to overfitting. BIC attempts to resolve this problem by introducing a penalty term for the number of parameters in the model. It is given from the following formula:

$$BIC = \ln(n)k - 2\ln(\hat{L}) \qquad \text{Eq. (1)}$$

where $\hat{L}$ is the maximized value of the likelihood function of the model, n the sample size (the number of layers in our case) and k the number of parameters estimated by the model. BIC is valid when the sample size n is much larger than k in the model. BIC may be plotted as a function of the number of Gaussian components, and the component number at which a changing point is present gives the optimum number of facies.

Figure 2:
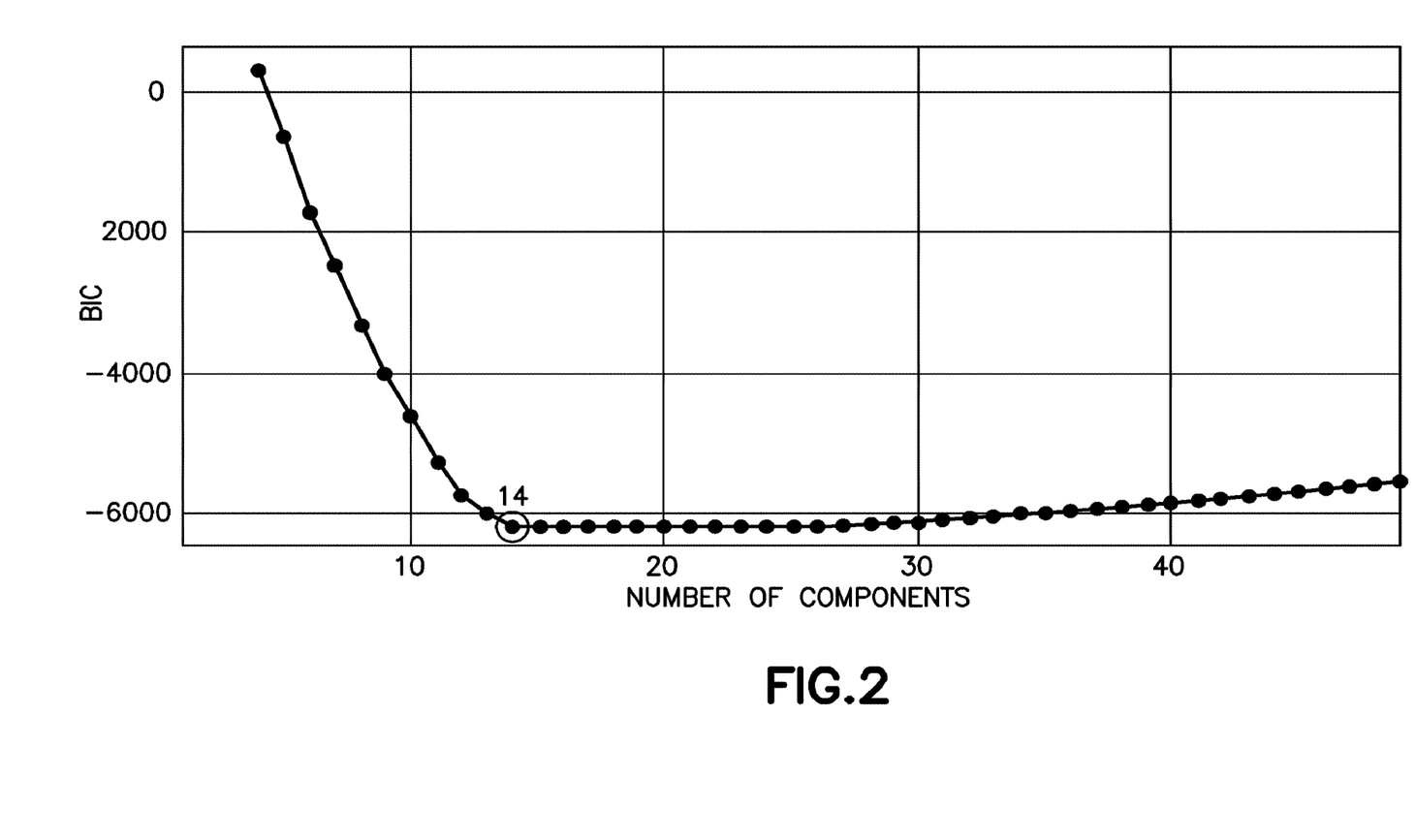
FIG. 2 is a plot of Bayesian Information Criterion values versus number of Guassian components.

To check the validity of the BIC criterion for the layer-based facies classification method of FIG. 1, a procedure was applied on synthetic data, since the true number of facies is known. Three input logs were used, with one of them being a high-resolution image log. Log-squaring on the median value of the high-resolution image log or the log measured from one pad of the imaging tool was applied to find the layer boundaries, and then using these layer boundaries log squaring was applied to the two other logs to calculate their values per layer. The number of components at which the BIC curve has a changing point gives the optimum number of facies. As seen in FIG. 2, the curve changing point is located at fourteen Guassian components. In fact, the procedure was applied to six synthetic data sets and BIC predicted the exact number of facies in all of them.

In still other embodiments, the number or quantity n of facies can be determined in 150 using the BIC in combination with an entropy method to improve the estimation of the number of facies. This method allows to classify some cross-over components into the same facies.

FIGS. 3A-3E show three well logs, a true facies classification, a predicted facies classification produced by the layer-based facies classification method of FIG. 1, and a predicted facies classification produced by the prior art IPSOM method. It will be appreciated that the predicted facies from the layer-based facies classification method are almost identical to the true facies, while some of the facies predicted by the prior art IPSOM method are different from the true ones.

Figure 4A:
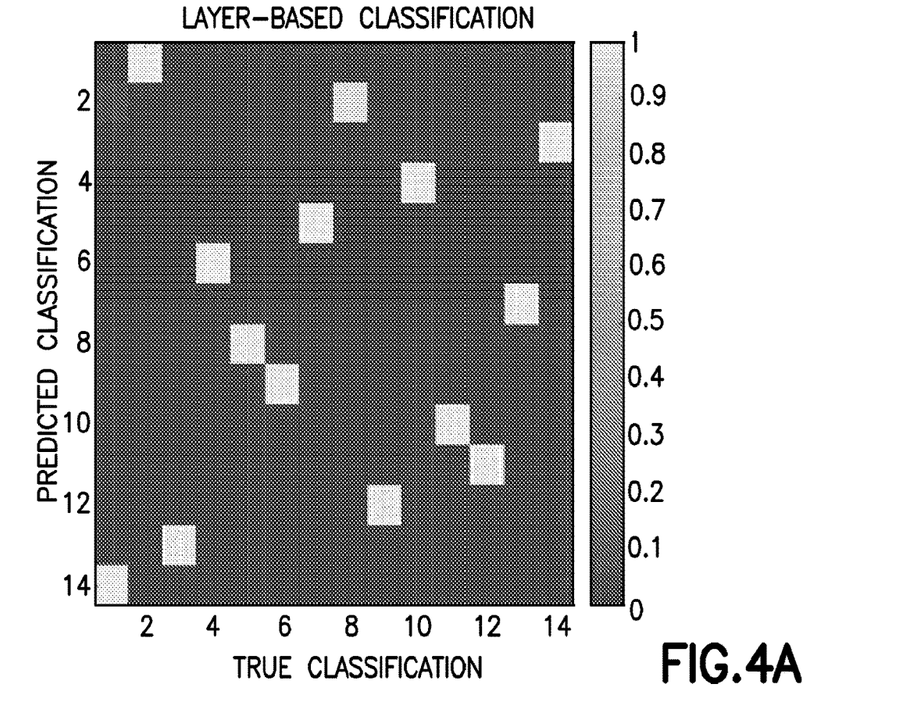
FIGS. 4A and 4B show confusion matrices for the layer-based facies classification method of FIG. 1 and the prior art IPSOM method, respectively.
Figure 4B:
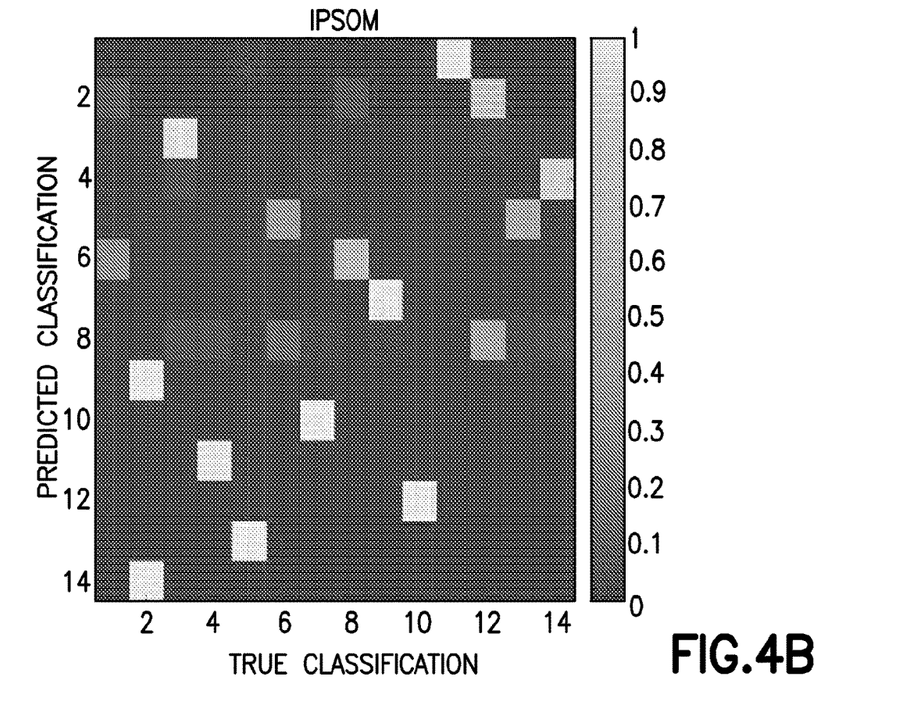

To further visualize the performance of the layer-based facies classification method provided by the GMM method and compare it with the prior art IPSOM method, confusion matrices comparing the ground truth classification against the predicted one were used for each method. The confusion matrices for the layer-based facies classification method of FIG. 1 and the prior art IPSOM method are shown in FIGS. 4A and 4B, respectively. Each row of the matrix represents the instances in a predicted class, while each column represents the instances in the true facies. The confusion matrix values for each row are normalized to the total number of layers that are classified to each predicted class. Due to the randomness in the way the classification method assigns the class index, the predicted facies index will not be the same with the true facies index, although they have the same properties. Thus, the comparison between the true and predicted classification is based on the true facies indices distribution within each predicted facies index. Ideally, the true facies indices distribution within each predicted facies index will be skewed to a single true facies index. For each row of the confusion matrix, each column takes a value between 0 and 1 (gray-scale colored between dark and light). The ideal scenario for each row is to have one column equal to 1 (light) and all other columns equal to 0 (dark), which means each predicted facies index corresponds to one true facies index. It can be seen that in the layer-based facies classification confusion matrix of FIG. 4A, each predicted facies index contains layers belonging to only one true facies index, while in IPSOM confusion matrix of FIG. 4B, each predicted facies index has a distribution of true facies indices, showing that the layer-based facies classification method of FIG. 1 is better than the prior art IPSOM method.

The quality of the layer-based classification method employing the GMM method was also quantified by estimating similarity metrics (adjusted Rand index, mutual information-based score, homogeneity, completeness and V-measure scores) and the values of those metrics were compared with their respective values from the prior art IPSOM method. The value of those metrics is one when the classification matches the ground truth one. For all synthetic data sets the layer-based classification gives metrics values that are better than the prior art IPSOM method.

Figure 5:
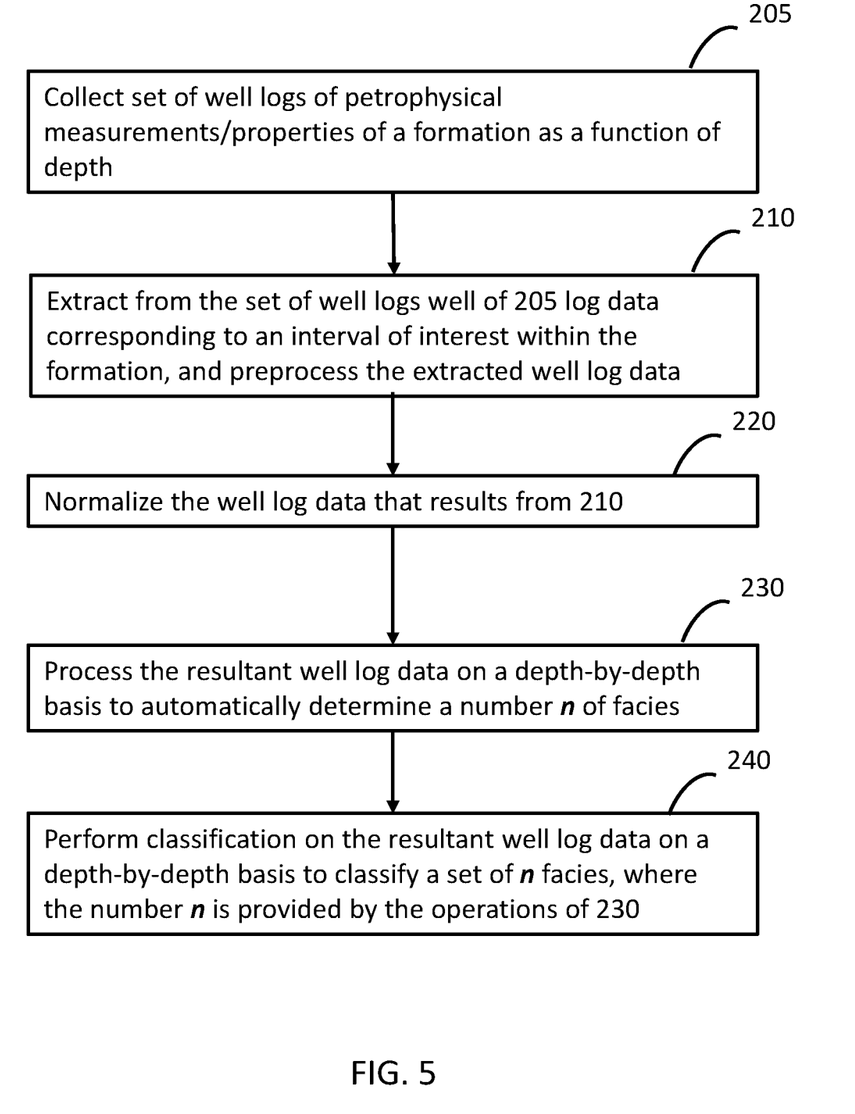
FIG. 5 is a flow chart of a depth-based unsupervised facies classification method according to the present disclosure.

According to another embodiment, a depth-based facies classification method is provided as shown in FIG. 5. The depth-based facies classification method can be used in scenarios where relatively high resolution imaging logs are not available and hence a traditional depth-by-depth log processing is required. Thus, as seen in FIG. 5, a set of well logs pertaining to a formation is collected at 205. The set of well logs include petrophysical measurements or properties of the formation as a function of depth within a borehole that traverses the formation. In embodiments, the set of well logs can include a gamma ray log obtained from a gamma ray tool, a resistivity log obtained from an induction-type resistivity tool, a resistivity log obtained from a propogation-type tool, a litho-density log (for example, as obtained from the Litho-Density Tool (LDT) of Schlumberger), a porosity log obtained from a neutron porosity tool (utilizing a fast neutron source), etc. In other embodiments, the classification method shown in FIG. 5 is not restricted to a specific type of logs.

At 210, well log data corresponding to an interval of interest within the formation is extracted from the set of well logs of 205, and the extracted well log data is preprocessed. For example, the preprocessing can involve checking and validating the extracted well log data to ensure that the well log data is in proper ranges without missing values.

At 220, the resultant well log data of 210 can be normalized. In addition, the normalized log data can possibly be assigned weights based on the quality or resolution of facies classification provided by the logging tool that measured the underlying well log data. Such weights can be configured to appropriately scale the normalized log data that are derived from different logging tools with varying resolution.

At 230, the resultant log data of 220 is processed on a depth-by-depth basis to automatically determine a quantity or number n of facies. In embodiments, the processing of 230 can employ a method where the optimal number of facies (clusters) is based on the repeatability or consistency of the clustering results. In this approach, an arbitrary number of facies (clusters) is assumed and for each number of clusters multiple realizations of clustering are performed to obtain an ensemble of the cluster logs, from which a similarity score can be computed.

In still other embodiments, the processing of 230 can employ Bayesian Information Criterion (BIC) to determine the quantity or number n of facies. Details of Bayesian Information Criterion (BIC) are set forth in Schwarz, G., "Estimating the dimension of a model", Annals of Statistics, vol. 6 no. 2, pp. 461-464 (1978)). The processing of 230 can optionally combine Bayesian Information Criterion (BIC) with an entropy method to determine the quantity or number n of facies. This method allows to classify some cross-over components into the same facies.

Figure 8A:
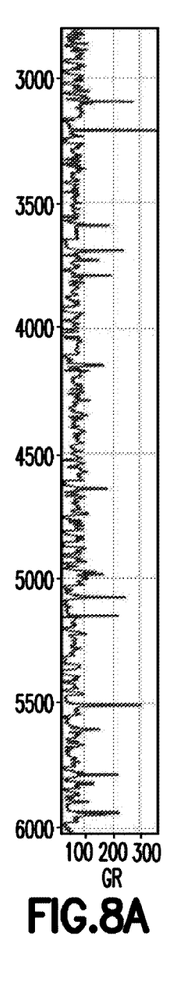
FIGS. 8A-8E depict five well logs coming from concatenating various wells that are used as input to the facies classification method of FIG. 5.
Figure 8B:
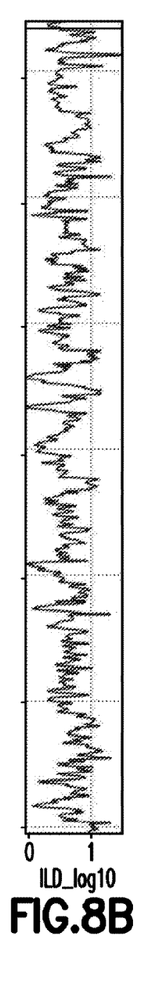
Figure 8C:
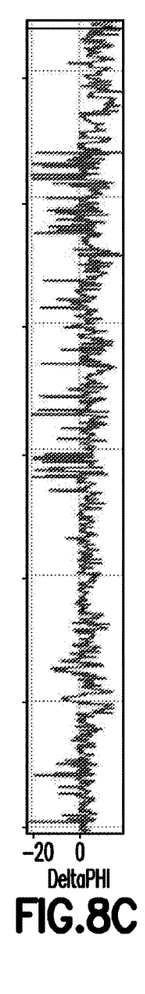
Figure 8D:
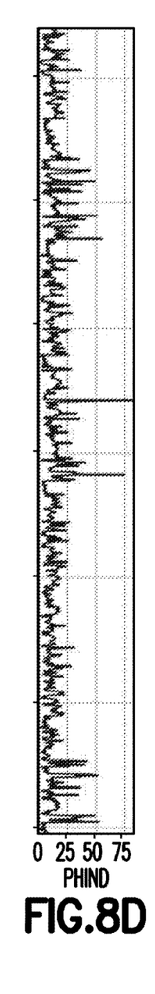
Figure 8E:
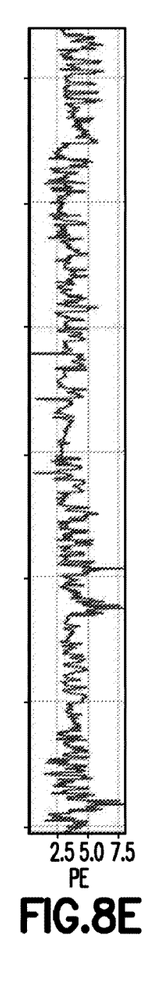
Figure 8F:
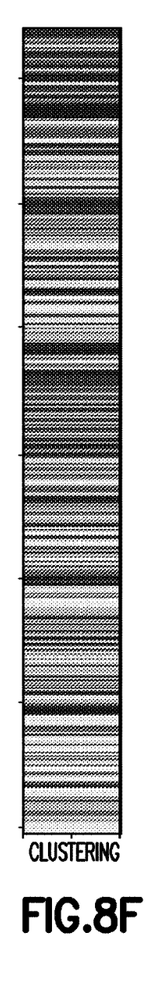
FIG. 8F depicts the clustering result from the facies classification method of FIG. 5.

At 240, classification is performed on the resultant log data of 220 on a depth-by-depth basis (e.g., over vectors of resultant log data for different depths) to classify or identify a set of n facies, where the number n is provided by the operations of 230. Different classification algorithms may be utilized. By way of example, and as discussed herein, a Gaussian mixture model (GMM) method may be utilized (see, e.g., Bishop, C., "Pattern Recognition and Machine Learning", Springer (2006)). In the classification, a thin layer with thickness less than a threshold thickness can be assigned to the same class with a layer of thickness higher than threshold whose value is the closest to the value of that thin layer. Data representing the set of n facies can be stored electronically for subsequent analysis and/or used to output and display a visual representation of the set of n facies, such as a plot of the set of n facies as a function of depth in the formation (FIG. 8F).

The depth-based facies classification method of FIG. 5 was applied to field data coming from the Hugoton gas field located in Kansas, Oklahoma and Texas. See, Dubois, M. K. et al., "Comparison of four approaches to a rock facies classification problem", Computers & Geosciences, 33, no. 5, pp. 599-617 (2007). The data set consists of seven measurements (five wireline log measurements and two indicator variables) from nine gas wells. The logs are gamma ray, resistivity, photoelectric effect, neutron-density porosity difference, average neutron-density porosity and the geologic constraining variables are the nonmarine/marine indicator and the relative position. The lithofacies identified in Dubois, M. K. et al., were based on a visual examination of core descriptions from the nine wells. For purposes herein, the data of each well was not worked on separately, but the data from all nine wells was concatenated and treated as a whole (FIGS. 8A-8E), in alignment with the approach followed in Hall, B., "Facies classification using machine learning", The Leading Edge, 35, pp. 906-910 (2016).

Figure 6:
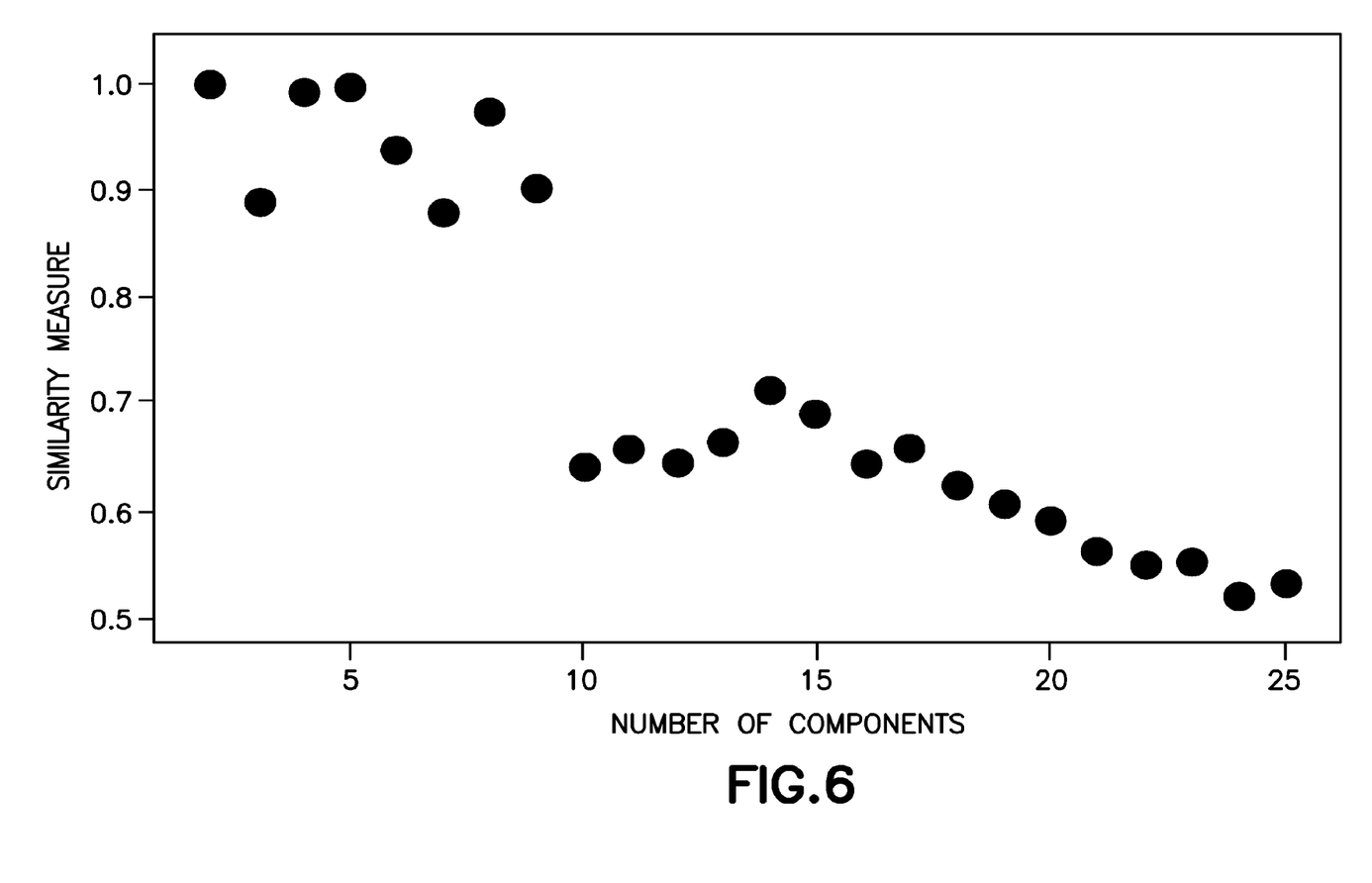
FIG. 6 is a plot of repeatability of clustering result versus number of clusters.

The number of clusters identified from the approach based on the repeatability or consistency of the clustering results shown in FIG. 6 was nine, where assuming an arbitrary number of clusters (from two to twenty-five), multiple realizations of clustering (e.g., 100) were performed to obtain an ensemble of cluster logs from which a similarity score could be computed. Repeating this process by enumerating the assumed number of clusters, a curve revealing the relationship between the similarity verus the number of clusters is obtained. If a threshold (e.g., 0.9) is chosen as the threshold reflecting the desired similarity, the number of clusters used for the clustering is nine. This was also the number of clusters identified from the BIC criterion.

Figure 7:
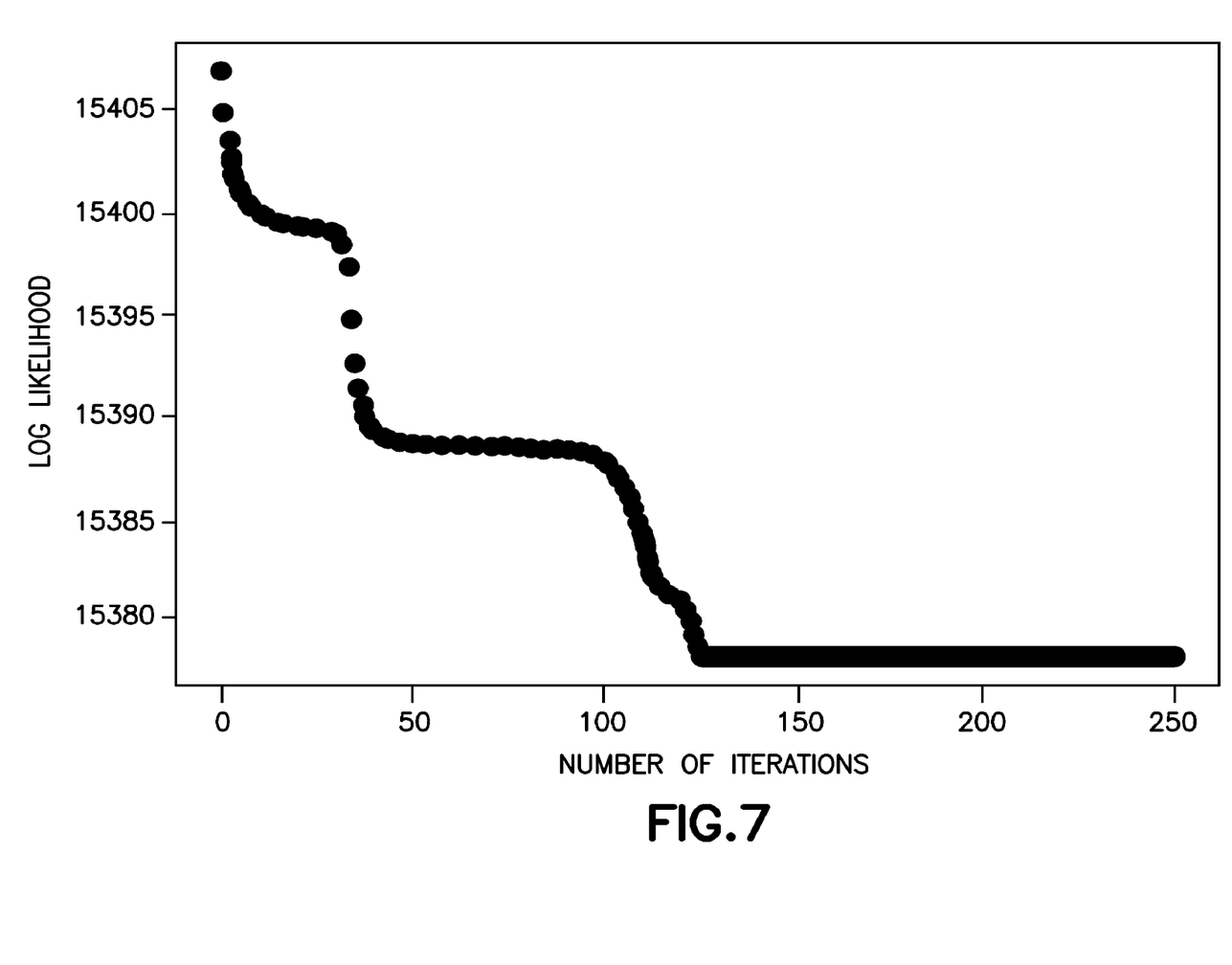
FIG. 7 depicts the convergence of the log-likelihood of one of the realizations of clustering produced by the depth-based facies classification method of FIG. 5.

The depth-based classification workflow is applied for multiple realizations. Each realization is run for multiple iterations, with the output parameters from one iteration (mean, covariance and weight of each Gaussian component) being used to initialize the parameters of the next iteration, to guarantee convergence to a local minimum. FIG. 7 shows the convergence of the log-likelihood for one realization of GMM.

Figure 8G:
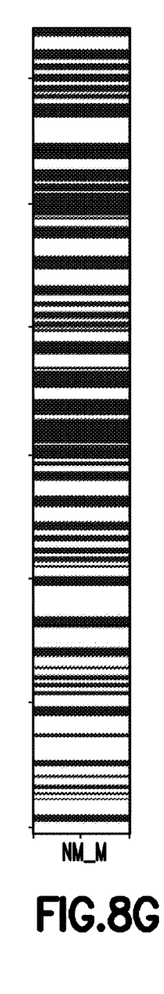
FIG. 8G depicts the nonmarine/marine indicator, labeled by experts.
Figure 8H:
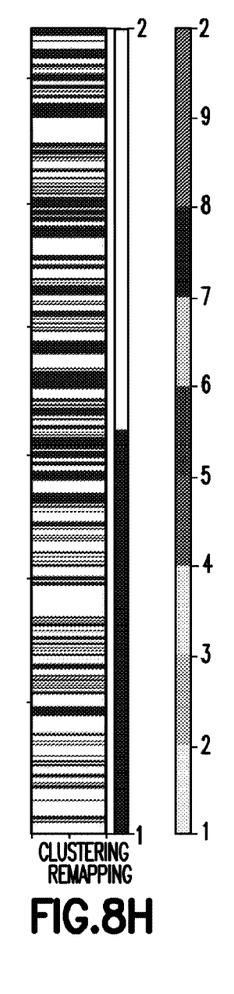
FIG. 8H depicts the remapping of the predicted nine clusters of FIG. 8F into two clusters in order to compare them with the clusters of FIG. 8G.
Figure 9A:
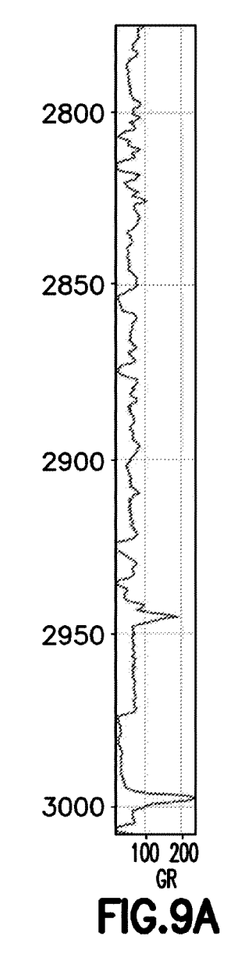
FIG. 9A-9E depict five well logs from an example well (SHANKLE well) for input to the facies classification method of FIG. 5.
Figure 9B:
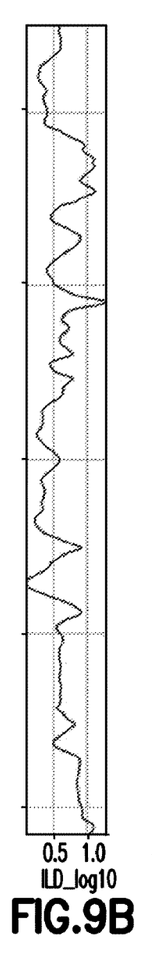
Figure 9C:
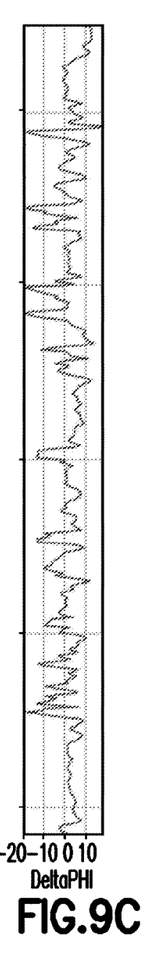
Figure 9D:
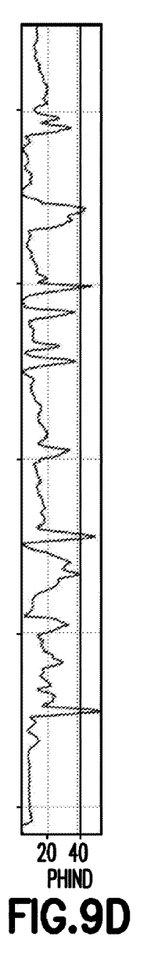
Figure 9E:
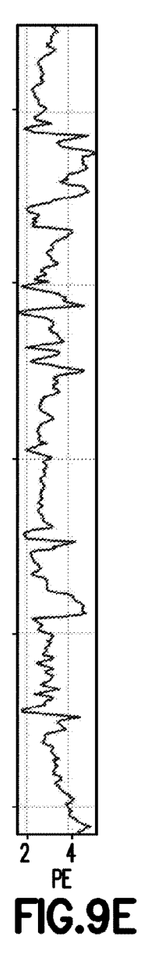
Figures 9F, 9G:
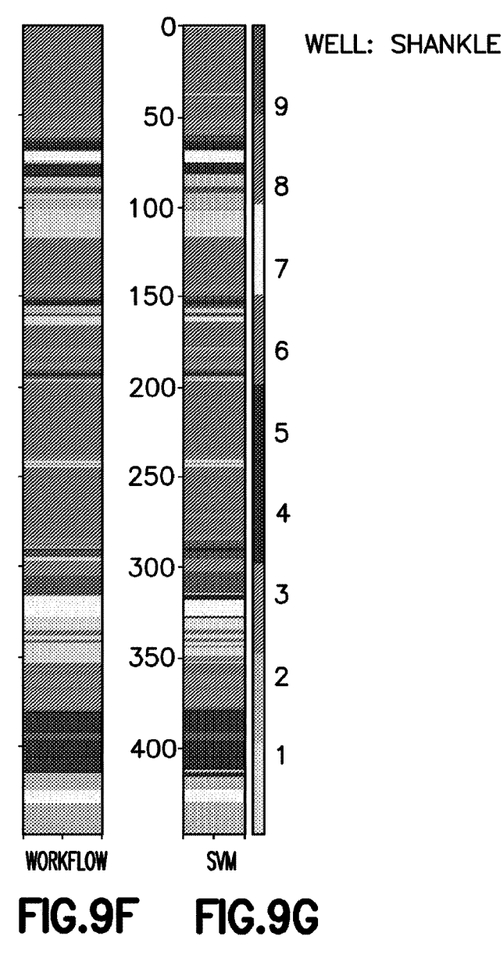
FIG. 9F depicts facies classification as a function of depth in the example well, which results from the depth-based unsupervised facies classification method of FIG. 5 applied to the five well logs of FIG. 9A-9E.
FIG. 9G depicts facies classification as a function of depth in the example well, which results from an SVM classification method applied to the five well logs of FIG. 9A-9E, where the SVM classification method is trained from manual (human) labeled measurements of rock core samples.

The clustering from the method of FIG. 5 is shown in FIG. 8F. To evaluate the accuracy of our clustering result the 9 clusters are remapped into 2 clusters to compare them with the nonmarine/marine indicator NM_M, labeled by experts, shown in the FIG. 8G (1 for nonmarine in black, 2 for marine in white). We remap each of the 9 predicted clusters as marine or nonmarine facies, based on which facies their majority belongs to. For example, most of (>50%) samples (i.e., depths) in the first cluster (colored in yellow) are classified by experts to be marine facies, hence we remap the first cluster to marine facies. This process is repeated for all other clusters. The remapping result is shown in FIG. 8H and is very similar to FIG. 8G. Taking the FIG. 8G as the ground truth, FIG. 8H has an accuracy of 85%.

To further evaluate the accuracy of facies classification method of FIG. 5, an approach similar to the approach of Hall may be used where they use eight of the nine gas wells as the training set, train a support vector machine (SVM) classification algorithm with the seven measurements and the corresponding labels from the core data as true labels and evaluate the accuracy of the SVM on the well that was not included in the training set and served as the test set. Since the method of FIG. 5 is unsupervised, a labeled data set is not available. This is overcome by using the cluster indices predicted in the workflow as true labels and training the SVM algorithm on eight wells, using the ninth well as the test set. Accuracy is evaluated by comparing on the test set the predicted clusters from the workflow with the predicted clusters from the SVM. In particular, the Shankle well served as the test set and the accuracy achieved using the workflow of the embodiment was 0.89, while in Hall, using the same well as the test set, an accuracy of 0.46 was achieved. It is believed that the reason that Hall's accuracy is low is the fact that the facies estimated from visual inspection of the cores are not very accurate and Hall trains the SVM algorithm using these facies as training labels. FIGS. 9A-9F shows the well logs and clustering results for the Shankle well.

It will be appreciated that the methods of FIGS. 1 and 5 both automatically determine the number of facies along a selected portion of the formation from input well logs and relieve the user from making a decision of the number of facies that are present for input into classification model. As a result of the methods of FIGS. 1 and 5, a better classification is conducted with a better honoring of different vertical resolution of varying input logs, consistent layer boundaries with high-resolution logs, and better accuracy for formations with thin layers.

Figure 10:
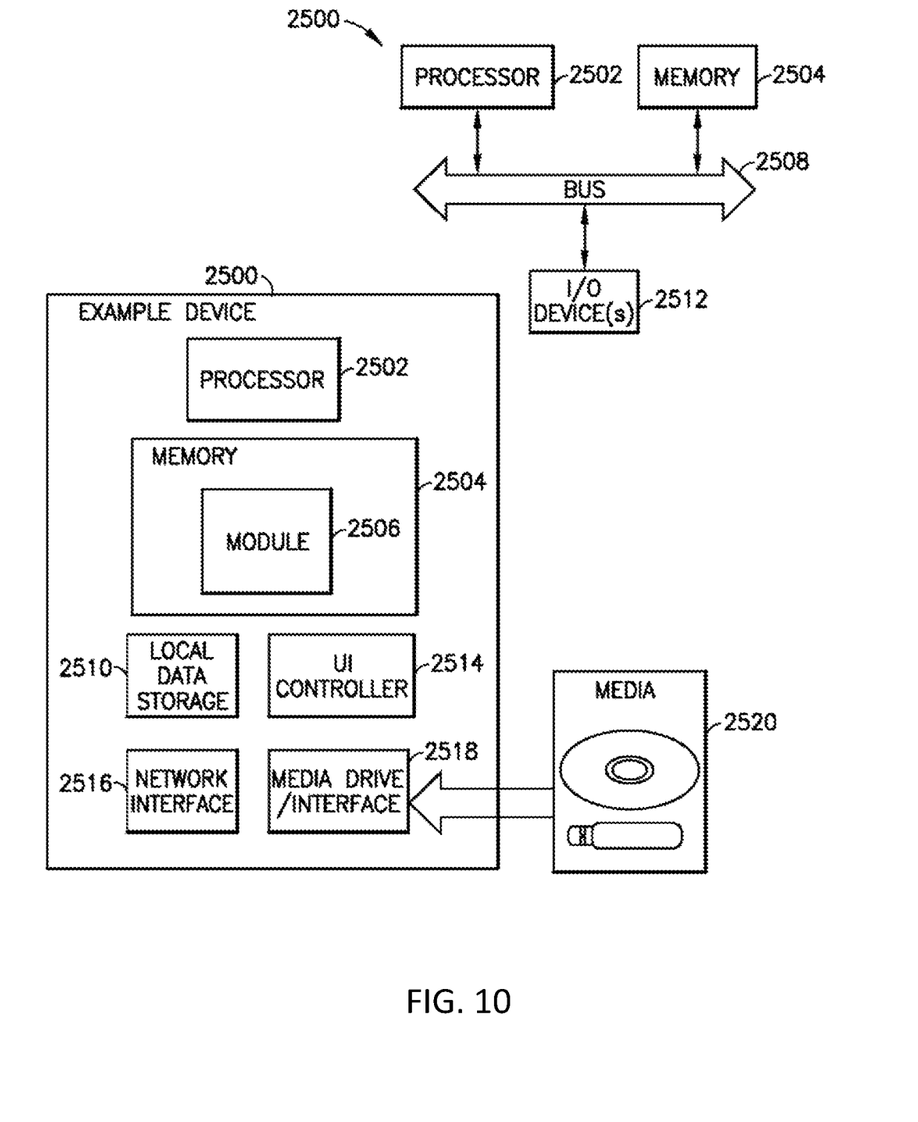
FIG. 10 is a block diagram of an exemplary computer processing system.

FIG. 10 illustrates an example device 2500, with a processor 2502 and memory 2504 that can be configured to implement various embodiments of the methodology and systems as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, such as (by way of example and not by way of limitation) pre-processing of logs, identifying layer boundaries from the image log, upscaling log values, normalizing obtained layer property vectors, determining the number of facies from the normalized layer property vectors, and performing classification based on the normalized layer property vectors, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

All references, including publications, patent applications and patents, cited herein are hereby incorporated by reference to the same extent as if each reference were individually and specifically indicated to be incorporated by reference and were set forth in its entirety herein.

There have been described and illustrated herein several embodiments of methods and systems that perform facies classification of a formation based on a set of well logs of the formation. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed. In one aspect, some or all of the methods and processes described above.

What is claimed is:

1. A method of classifying facies of a geological formation, the method comprising:
    a) generating data characterizing properties of a portion of the geological formation as a function of depth based on well log data obtained from a plurality of different well logging tools, the well log data comprising a plurality of images having varying resolution, the well log data being part of a layer model that includes a number of layers each associated with a vector of properties of the portion of the geological formation and layer boundaries, the generating the data characterizing the properties of the portion of the geological formation as the function of depth based on the well log data obtained from the plurality of different well logging tools comprising:
        identifying the layer boundaries from the well log data;
        generating the layer model based on the identified layer boundaries and the well log data;
        determining a respective resolution of facies classification of each of the well logging tools that obtained the plurality of images of the well log data at the varying resolution;
        normalizing the well log data based on the determined resolution of the facies classification of the well logging tools that obtained the well log data; and
        determining the properties of the vectors of the layer model by assigning weights to appropriately scale the normalized well log data obtained from the plurality of different well logging tools based on the resolution of the facies classification of the well logging tools that obtained the plurality of images of the well log data of the varying resolution such that corresponding well log data for each of the well logging tools is scaled to a highest resolution among the respective resolutions of the well logging tools;
    b) processing the data of a) to automatically classify or identify a set of facies for the portion of the geological formation including automatically determining, without human input, a number of facies in the set;
    c) automatically generating a two-dimensional image of the portion of the geological formation as a function of depth, the two-dimensional image comprising a plurality of layer lines each having a thickness corresponding to the highest resolution such that each of the plurality of layer lines has a color corresponding to a facies classification; and
    d) outputting and displaying the two-dimensional image of the portion of the geological formation identifying the set of facies based on the facies classification corresponding to the color of each respective layer line.

2. The method according to claim 1, wherein:
the data of a) is generated by preprocessing the well log data obtained from the plurality of well logging tools.

3. The method according to claim 2, wherein:
the preprocessing involves performing a dimension reduction on the well log data obtained from the plurality of well logging tools.

4. The method according to claim 1, wherein:
the layer boundaries are identified by processing well log data obtained from at least one predetermined well logging tool.

5. The method according to claim 4, wherein:
the layer boundaries are identified by application of log squaring or a changing point algorithm to the well log data obtained from the at least one predetermined well logging tool.

6. The method according to claim 1, wherein:
the data of a) is based on well log data obtained depth-by-depth over the portion of the geological formation.

7. The method according to claim 1, wherein:
the data of a) is determined by at least one of:
    i) upscaling well log data obtained from the plurality of well logging tools;
    ii) normalizing well log data obtained from the plurality of well logging tools; and
    iii) assigning weights to well log data obtained from the plurality of well logging tools based on quality or resolution of facies discrimination of the well logging tool that obtained the well log data.

8. The method according to claim 1, further comprising:
processing the data of a) to automatically determine the number of facies in the set of facies determined in b).

9. The method according to claim 8, wherein:
the processing prior to b) uses a Bayesian Information Criterion (BIC) to automatically determine the number of facies in the set of facies without human input.

10. The method according to claim 1, wherein:
the processing of b) uses a method in which an optimal number of facies clusters is based on a repeatability or consistency of clustering results and there is no human input regarding the optimal number of clusters.

11. The method according to claim 1, wherein:
the processing of b) uses a Gaussian mixture model (GMM) method to perform facies classification for the portion of the geological formation.

12. The method according to claim 11, wherein:
a clustering analysis uses the Gaussian mixture model (GMM) method.

13. The method according to claim 1, wherein the well log data is not restricted to a specific type of well log.

14. The method according to claim 1, wherein:
operations a) and b) are performed by a processor.

15. The method according to claim 1, further comprising:
storing in electronic form data representing the set of facies determined in b) or using said data to output and display visual representation of the set of facies determined in b).

16. A system for classifying facies of a geological formation, comprising:
one or more processors configured to:
a) generate data charactering properties of a portion of the geological formation as a function of depth based on well log data obtained from a plurality of different well logging tools, the well log data comprising a plurality of images having varying resolution, wherein the well log data is part of a layer model that includes a number of layers each associated with a vector of properties of the portion of the geological formation and layer boundaries, the generating the data characterizing the properties of the portion of the geological formation as the function of depth based on the well log data obtained from the plurality of different well logging tools comprising:
identifying the layer boundaries from the well log data;
generating the layer model based on the identified layer boundaries and the well log data;
determining a respective resolution of facies classification of each of the well logging tools that obtained the plurality of images of the well log data at the varying resolution;
normalizing the well log data based on the determined resolution of the facies classification of the well logging tools that obtained the well log data; and
determining the properties of the vectors of the layer model by assigning weights to appropriately scale the normalized well log data obtained from the plurality of different well logging tools based on the resolution of the facies classification of the well logging tools that obtained the plurality of images of the well log data of the varying resolution such that corresponding well log data for each of the well logging tools is scaled to a highest resolution among the respective resolutions of the well logging tools;
b) process the data of a) to automatically classify or identify a set of facies for the portion of the geological formation including automatically determining, without human input, a number of facies in the set;
c) automatically generate a two-dimensional image of the portion of the geological formation as a function of depth, the two-dimensional image comprising a plurality of layer lines each having a thickness corresponding to the highest resolution such that each of the plurality of layer lines has a color corresponding to a facies classification; and
d) output and display the two-dimensional image of the portion of the geological formation identifying the set of facies based on the facies classification corresponding to the color of each respective layer line.

* * * * *